United States Patent
Lorich et al.

(10) Patent No.: US 11,998,415 B2
(45) Date of Patent: Jun. 4, 2024

(54) SYSTEM AND METHOD OF FORMING A CUSTOM BLEACHING TRAY WITH TRENCH AND MATERIAL RESERVOIRS

(71) Applicant: SprintRay Inc., Los Angeles, CA (US)

(72) Inventors: Mark Lorich, Los Angeles, CA (US); Amir Gordgi, Los Angeles, CA (US)

(73) Assignee: SprintRay, Inc., Los Angeles, CA (US)

(*) Notice: Subject to any disclaimer, the term of this patent is extended or adjusted under 35 U.S.C. 154(b) by 0 days.

(21) Appl. No.: 17/983,393

(22) Filed: Nov. 8, 2022

(65) Prior Publication Data
US 2023/0144730 A1 May 11, 2023

Related U.S. Application Data

(60) Provisional application No. 63/277,054, filed on Nov. 8, 2021.

(51) Int. Cl.
*A61C 19/06* (2006.01)
*B29C 64/188* (2017.01)
(Continued)

(52) U.S. Cl.
CPC .......... *A61C 19/066* (2013.01); *B29C 64/188* (2017.08); *B29C 64/393* (2017.08);
(Continued)

(58) Field of Classification Search
CPC ... A61C 19/066; B29C 64/188; B29C 64/393; B33Y 10/00; B33Y 30/00; B33Y 50/02;
(Continued)

(56) References Cited

U.S. PATENT DOCUMENTS

2003/0232311 A1* 12/2003 Keller .................. A61C 19/066
433/80
2019/0105842 A1 4/2019 Dau et al.
(Continued)

FOREIGN PATENT DOCUMENTS

DE 102016210990 12/2017
KR 101458120 B1 * 11/2014
(Continued)

*Primary Examiner* — Chun Cao
*Assistant Examiner* — Michael Tang
(74) *Attorney, Agent, or Firm* — JAFARI LAW GROUP, INC.

(57) ABSTRACT

A custom bleaching tray or device with trench and material pocket/reservoir is disclosed. The device comprises a trench to avoid leakage of bleaching material onto the gingiva and a reservoir to precisely hold the bleaching material on the surface of the tooth. A method for forming a 3D-printed custom bleaching tray may include: providing or accessing teeth scan data associated with a patent's mouth; generating a digital model of the patient's mouth based on the teeth scan data, including manipulating the teeth scan data to form: a trench between one or more teeth and a gingiva region of the teeth scan data, and a bleaching material reservoir on a surface of each of the one or more teeth of the teeth scan data; and 3D-printing, based on the digital model, a 3D-printed bleaching tray. A thermoforming process may be applied to the 3D-printed bleaching tray.

11 Claims, 10 Drawing Sheets

(51) Int. Cl.
    *B29C 64/393*     (2017.01)
    *B33Y 10/00*     (2015.01)
    *B33Y 30/00*     (2015.01)
    *B33Y 50/02*     (2015.01)
    *G06T 7/00*     (2017.01)
    *B29L 31/00*     (2006.01)

(52) U.S. Cl.
    CPC .............. *B33Y 10/00* (2014.12); *B33Y 30/00* (2014.12); *B33Y 50/02* (2014.12); *G06T 7/0012* (2013.01); *B29L 2031/753* (2013.01); *G06T 2210/41* (2013.01)

(58) Field of Classification Search
    CPC ....... B33Y 50/00; B33Y 80/00; G06T 7/0012; G06T 2210/41; B29L 2031/753

USPC ................................................ 700/98; 433/2
See application file for complete search history.

(56) References Cited

U.S. PATENT DOCUMENTS

| | | | | |
|---|---|---|---|---|
| 2021/0238328 A1* | 8/2021 | Wu | ........................ | A61K 6/893 |
| 2021/0401546 A1* | 12/2021 | Gardner | ................. | A61C 7/002 |
| 2022/0241061 A1* | 8/2022 | Kim | ........................ | B33Y 80/00 |
| 2023/0049287 A1* | 2/2023 | Fisker | ................. | A61C 19/066 |

FOREIGN PATENT DOCUMENTS

| | | |
|---|---|---|
| KR | 101458120 B1 | 11/2014 |
| KR | 102139071 B1 * | 7/2020 |
| WO | WO 2020/249583 | 12/2020 |

* cited by examiner

SYSTEM AND METHOD OF FORMING A CUSTOM BLEACHING TRAY WITH TRENCH AND MATERIAL RESERVOIRS

PRIORITY AND RELATED APPLICATIONS

This application claims priority to and is a Non-Provisional Application of U.S. Provisional Application No. 63/277,054, filed on Nov. 8, 2021, the disclosure of which is incorporated by reference in its entirety.

TECHNICAL FIELD

The present invention generally relates to the field of dental care. More specifically, the present invention relates to a system, device, and method configured to bleach teeth without any spillage of whitening materials during use.

BACKGROUND

Tooth whitening or tooth bleaching is a process of lightening the color of the human teeth. Tooth bleaching is the most common procedure in cosmetic dentistry. Bleaching of teeth is one of the most conservative and cost-effective dental treatments for discolored teeth than aggressive methods like veneering, crowning, or bonding to enhance an individual smile.

The bleaching material used for teeth whitening is meant only to be applied to the surface of teeth. When this material is in contact with the patient's gingiva, irritation and color change can occur. If saliva mixes into the bleaching tray and bleaching material, it will flow and mix around the rest of the mouth, and also reduce efficacy from dilution. Bleaching material in the mouth or saliva can also be unsafe to the patient.

The traditional bleaching method involves the steps of taking records including impressions or scanning of the patient's mouth, creating a model of the patient's mouth (stone or 3D printed/milled), manually adding material on the surface of the teeth to create a reservoir, forming a vacuum in the appliance using a thermoforming machine, and marking boundaries of the teeth and gingiva and trimming the boundary (scalloping).

Though the existing methods provide a solution for tooth whitening, they yield a poor user experience and are inconvenient to the user. If the bleaching apparatus is difficult to install over a person's teeth, requires numerous repetitions to achieve observable results, or is uncomfortable to wear, the user may simply give up and prematurely abort the prescribed bleaching regimen. Moreover, prior art methods and devices are not scalable because they typically involve manually removing material, which even in a digital environment, is not a scalable process and thus may be prohibitively time consuming.

In light of all the above-mentioned drawbacks, there is a need for an innovative and intelligent solution to whitening teeth without contacting the user's gingiva and causing irritation. Also, there is a need for a device to maintain the bleaching material without any spillage during use. It is to these ends that the present invention has been developed.

SUMMARY OF THE INVENTION

The present invention generally discloses a dental care product and method. More specifically, the present invention relates to a device and method configured to bleaching or whitening teeth without any spillage of whitening materials during use.

According to one aspect of the present invention, a customized bleaching tray or tooth whitening device is disclosed. According to another aspect of the present invention, a method of forming the customized bleaching tray or tooth whitening device is disclosed. In one embodiment, the device is an intelligent solution that has been designed to bleach or whiten teeth without any spillage during use. In one embodiment, the device eliminates the contact of whitening material with the gingiva, thereby avoiding any irritation or color change that occurred during the whitening process. In one embodiment, the device comprises a trench and a reservoir or dam. In one embodiment, the trench is used to avoid leakage of bleaching material onto the gingiva. In one embodiment, the material reservoir or pocket is used to precisely hold the bleaching material on the surface of the tooth.

One aspect of the present invention involves a method for forming a three-dimensionally (3D) printed custom bleaching tray. In one exemplary embodiment, the method may include: providing or accessing teeth scan data associated with a patent's mouth; generating a digital model of the patient's mouth based on the teeth scan data, including manipulating the teeth scan data to form: a trench between one or more teeth and a gingiva region of the teeth scan data, and a bleaching material reservoir on a surface of each of the one or more teeth of the teeth scan data; and 3D-printing, based on the digital model, a 3D-printed bleaching tray that includes the trench and the bleaching material reservoir(s).

In another exemplary embodiment, the method may include: providing or accessing teeth scan data associated with a patent's mouth; generating a digital model of the patient's mouth based on the teeth scan data, including manipulating the teeth scan data to form: a trench between one or more teeth and a gingiva region of the teeth scan data; and a bleaching material reservoir on a surface of each of the one or more teeth of the teeth scan data; and 3D-printing, based on the digital model, a 3D-printed bleaching tray that includes the trench and the bleaching material reservoir(s); and applying a thermoforming process to the 3D-printed custom bleaching tray.

In some exemplary embodiments, manipulating the teeth scan data comprises moving a position of one or more teeth in relation to a gingiva region on the teeth scan data.

In some exemplary embodiments, moving the position of one or more teeth in relation to the gingiva region on the teeth scan data includes moving one or more of the teeth buccally. In some exemplary embodiments, moving the position of one or more teeth in relation to the gingiva region on the teeth scan data includes applying a mesial movement. In some exemplary embodiments, moving the position of one or more teeth in relation to the gingiva region on the teeth scan data includes applying a distal movement.

In some exemplary embodiments, generating the digital model of the patient's mouth based on the teeth scan data further includes preserving an original position of each of the one or more teeth of the teeth scan data.

In some exemplary embodiments, manipulating the teeth scan data comprises modifying a gingiva boundary in accordance with one or more movements of the of one or more teeth in relation to the gingiva region on the teeth scan data to form the trench. In some exemplary embodiments, manipulating the teeth scan data comprises shelling an outline of a surface of one or more teeth at a set thickness in order to form the bleaching material reservoir.

In some exemplary embodiments, manipulating the teeth scan data is automatically performed by a software module based at least in part on the teeth scan data.

In some exemplary embodiments, manipulating the teeth scan data is automatically performed by the software module based at least in part on a set thickness adapted to form the bleaching material reservoir on the surface of each of the one or more teeth of the teeth scan data. In some exemplary embodiments, manipulating the teeth scan data is automatically performed by the software module based at least in part on a set distance to close gaps between an original position of each of the one or more teeth of the teeth scan data and a modified gingiva boundary in accordance with one or more movements of the of one or more teeth in relation to the gingiva region on the teeth scan data.

Another aspect of the present invention involves a system for forming a three-dimensionally (3D) printed custom bleaching tray. In one exemplary embodiment, the system may include: a computing device configured to access teeth scan data associated with a patent's mouth; a software module, stored in the computing device, including executable instructions configured to generate a digital model of the patient's mouth based on the teeth scan data, including executable instructions adapted to manipulate the teeth scan data to form: a trench between one or more teeth and a gingiva region of the teeth scan data, and a bleaching material reservoir on a surface of each of the one or more teeth of the teeth scan data; and a three-dimensional (3D) printer in communication with the computing device, the 3D printer configured to build, based on the digital model, a 3D-printed custom bleaching tray that includes the trench and the bleaching material reservoir(s).

In some exemplary embodiments, the system further includes a thermoforming device configured to apply a thermoforming process to the 3D-printed custom bleaching tray. In some exemplary embodiments, the system further includes an intraoral scanner in communication with the computing device configured to generate and provide the teeth scan data of the patent's mouth.

In some exemplary embodiments, the executable instructions of the software module are further adapted to modify a gingiva boundary in accordance with one or more movements of the of one or more teeth in relation to the gingiva region on the teeth scan data to form the trench. In some exemplary embodiments, the executable instructions of the software module are further adapted to shell an outline of a surface of one or more teeth at a set thickness in order to form the bleaching material reservoir. In some exemplary embodiments, the executable instructions of the software module are further adapted to move a position of one or more teeth in relation to a gingiva region on the teeth scan data.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF EXAMPLE EMBODIMENTS

Figure 1:
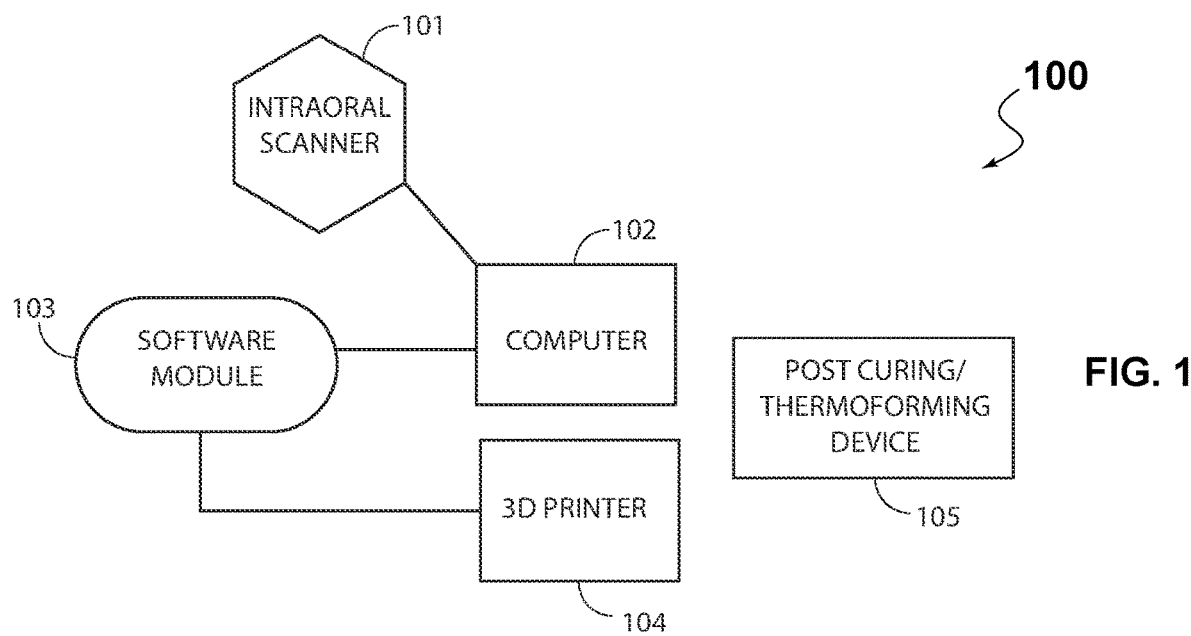
FIG. 1 shows an exemplary system for forming a custom bleaching tray with a trench and a material reservoir, in accordance with the present invention.

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiment include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

As used in this disclosure, the term "comprise" and variations of the term, such as "comprising" and "comprises", are not intended to exclude other additives, components, integers or steps. For purpose of description herein, the terms "upper", "lower", "left", "right", "front", "rear", "horizontal", "vertical" and derivatives thereof shall relate to the invention as oriented in figures. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristic relating to the embodiments disclosed herein are not to be considered as limiting, unless the claims expressly state otherwise.

Turning now to the figures, FIG. 1 shows an exemplary block diagram of a system 100 in accordance with the present invention, system 100 adapted for forming a three-dimensionally (3D) printed custom bleaching tray. System 100 is exemplarily shown comprising: an intraoral scanner 101 for obtaining a teeth scan of a patient's teeth; a computer 102, typically including a software module 103 configured to read or manipulate teeth scan data obtained by the computer (i.e., in some exemplary embodiments by way of intraoral scanner 101 or from another source) and generate a digital teeth model; a 3D printer 104 for printing a custom bleaching tray based on the digital teeth model; and a thermoforming device 105 for applying a thermoforming process to the 3D-printed custom bleaching tray.

In exemplary embodiments, system 100 includes a computing device, such as computer 102, which is configured to access teeth scan data associated with a patent's mouth; a software module 103, stored or accessible via the computing device, including executable instructions configured to generate a digital model of the patient's mouth based on the teeth scan data, including executable instructions adapted to manipulate the teeth scan data to form: a trench between one or more teeth and a gingiva region of the teeth scan data, and a bleaching material reservoir on a surface of each of the one or more teeth of the teeth scan data; and a 3D printer 104 in communication with the computing device 102, the 3D printer configured to build, based on the digital model, a 3D-printed custom bleaching tray (see for example FIG. 2) that includes the trench and the bleaching material reservoir(s) for securely and safely retaining the whitening or bleaching material during use of the bleaching tray.

In some exemplary embodiments, system 100 further includes a thermoforming device configured to apply a thermoforming process to the 3D-printed custom bleaching tray. In some exemplary embodiments, system 100 further includes an intraoral scanner 101 in communication with the computing device 102 configured to generate and provide the teeth scan data of the patent's mouth to the computing device. Of course, the teeth scan data may be provided by other means without deviating from the scope of the present invention, such as via a database or other source in communication with computing device 102.

In some exemplary embodiments, software module 103 resides in computing device 102 however software module 103 could also reside remotely on a server in communication with computing device 102 without deviating from the scope of the present invention. Moreover, computing device 102 may be a standalone computer, or any other computing device, including but not limited to a computing device integral with 3D printer 104.

In exemplary embodiments, executable instructions of the software module 103 are adapted to modify a gingiva boundary in accordance with one or more movements of the of one or more teeth in relation to the gingiva region on the teeth scan data to form the trench. In some exemplary embodiments, the executable instructions of the software module 103 are adapted to shell an outline of a surface of one or more teeth at a set thickness in order to form the bleaching material reservoir. In some exemplary embodiments, the executable instructions of the software module are further adapted to move a position of one or more teeth in relation to a gingiva region on the teeth scan data, as will be described in more detail below, including with reference to FIG. 3.

Figure 2:
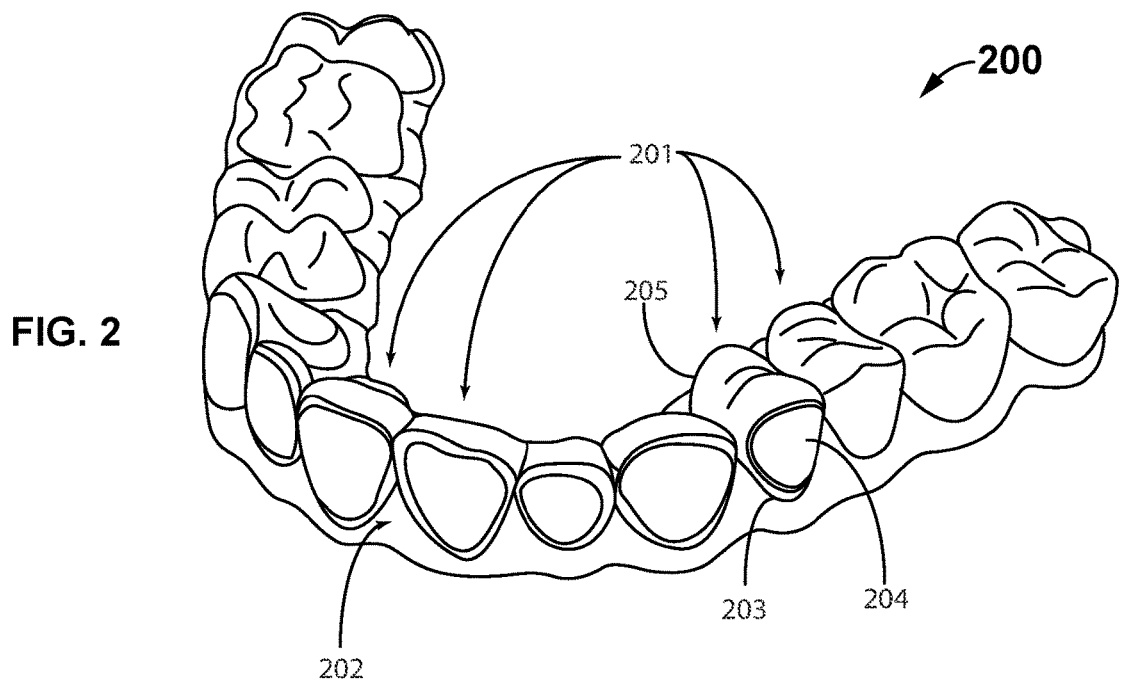
FIG. 2 shows a perspective view of an exemplary customized bleaching tray or tooth whitening device in accordance with the present invention.

Turning now to FIG. 2, a perspective view of a customized bleaching tray or tooth whitening device (device 200) is illustrated. In one embodiment, the device 200 is an intelligent solution that has been designed to bleach or whiten teeth without any spillage during use. In one embodiment, the device 200 eliminates the contact of whitening material with the gingiva, thereby avoiding any irritation or color change that occurred during the whitening process. Generally, device 200 is based on a digital teeth model of a patient's teeth, and as such will include at least a region 201 adapted to cover the patient's teeth, and a second region 202 adapted to cover a portion of the patient's gingiva adjacent to their teeth. In exemplary embodiments, device 200 comprises a trench 203 between the gingiva region 202 of device 200 and each of one or more teeth of the teeth disposed on the first region 201 of device 200 (also shown in FIG. 12). Moreover, device 200 also comprises a whitening material reservoir 204 (also shown in FIG. 13) formed on an interior surface of each of the one or more teeth on the first region 201 of device 200. For example, and without limiting the scope of the present invention, device 200 is shown to include a region 205, which is adapted to cover one of the patient's teeth; that region, modeled after the patient's teeth, includes a trench 203 and a reservoir 204. In exemplary embodiments, each of the other regions of device 200 adapted to cover each of the teeth of the patient that will be treated with the whitening material, will include a trench 203 between the gingiva region 202 of device 200 and the tooth being treated, and a whitening material reservoir 204 on each of the surfaces of the region adapted to cover each of the one or more teeth being treated with the whitening material. While the trench 203 prevents whitening material to come into contact with the gingiva of the patient, the material reservoir 204 is adapted to contain the whitening material so that a surface of the patient's teeth being treated may be safely exposed to the whitening material during treatment or use of device 200.

Figure 3:
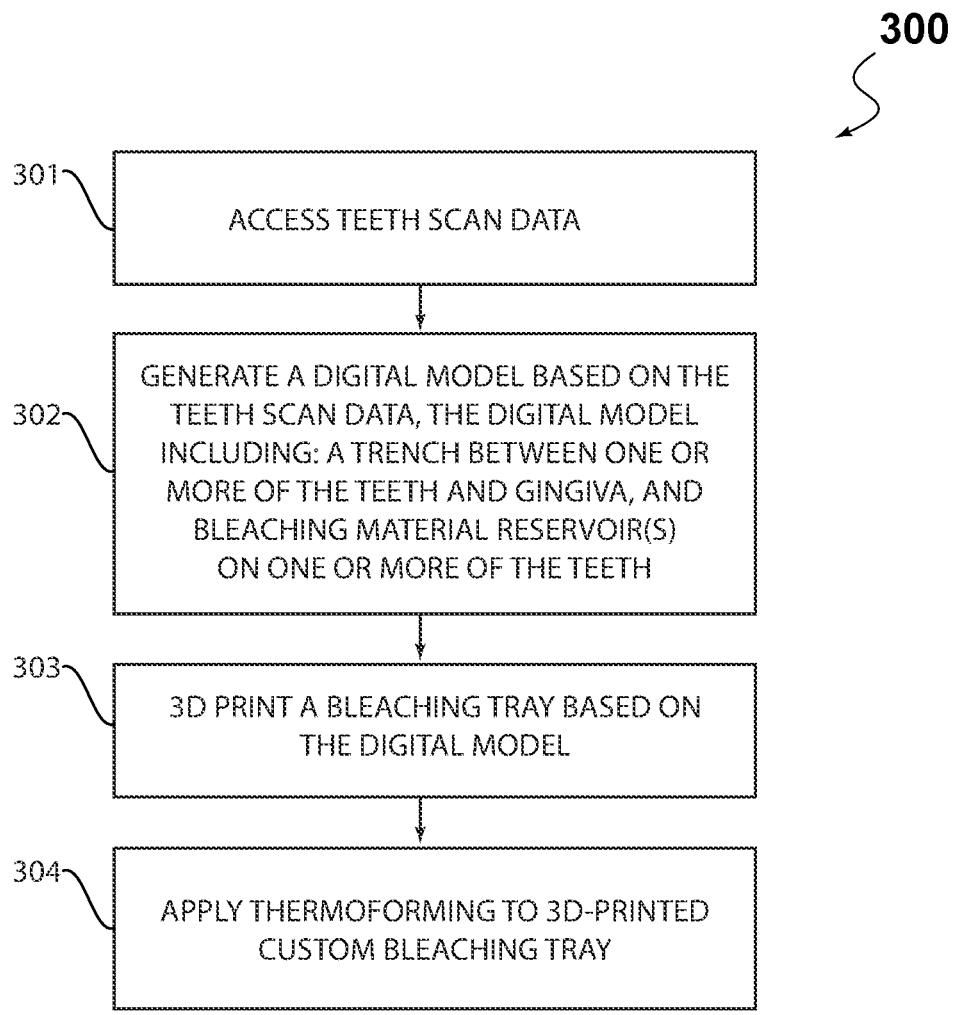
FIG. 3 shows an exemplary method of forming a customized bleaching tray in accordance with practice of exemplary embodiments of the present invention.

Now turning to FIG. 3, a block diagram illustrating a method of forming a customized bleaching tray in accordance with the present invention is shown. More specifically, FIG. 3 shows method 300 for forming a custom bleaching tray, in accordance with exemplary embodiments of the present invention. Although a series of steps 301-304 are shown for method 300, these steps may optionally include less steps, alternative or additional steps as discussed below, and may be illustrated in a particular sequence although each step may be practice in alternative sequences unless stated otherwise without deviating from the scope of the present invention.

In step 301, teeth scan data associated with a patent's mouth may be provided or accessed by a computing device. This may include obtaining the teeth scan data from intraoral scanner 101 or accessing the data from a known database that includes the teeth scan data of the patient.

In step 302, a digital model of the patient's mouth may be generated based on the teeth scan data. This step may include, manually or automatically by way of the software module, manipulating the teeth scan data to form a trench between one or more teeth and a gingiva region of the teeth scan data, and a bleaching material reservoir on a surface of each of the one or more teeth of the teeth scan data.

In some exemplary embodiments, this step includes moving, by way of the software module, a position of one or more teeth in relation to a gingiva region on the teeth scan data. In some exemplary embodiments, moving the position of one or more teeth in relation to the gingiva region on the teeth scan data includes moving one or more of the teeth buccally. In some exemplary embodiments, moving the position of one or more teeth in relation to the gingiva region on the teeth scan data includes applying a mesial movement. In some exemplary embodiments, moving the position of one or more teeth in relation to the gingiva region on the teeth scan data includes applying a distal movement. In some exemplary embodiments, generating the digital model of the patient's mouth based on the teeth scan data further includes preserving an original position of each of the one or more teeth of the teeth scan data.

In some exemplary embodiments, manipulating the teeth scan data comprises modifying a gingiva boundary in accordance with one or more movements of the of one or more teeth in relation to the gingiva region on the teeth scan data to form the trench. In some exemplary embodiments, manipulating the teeth scan data comprises shelling an outline of a surface of one or more teeth at a set thickness in order to form the bleaching material reservoir.

In some exemplary embodiments, manipulating the teeth scan data is automatically performed by a software module based at least in part on the teeth scan data. In some exemplary embodiments, manipulating the teeth scan data is automatically performed by the software module based at least in part on a set thickness adapted to form the bleaching material reservoir on the surface of each of the one or more teeth of the teeth scan data. In some exemplary embodiments, manipulating the teeth scan data is automatically performed by the software module based at least in part on a set distance to close gaps between an original position of each of the one or more teeth of the teeth scan data and a modified gingiva boundary in accordance with one or more movements of the of one or more teeth in relation to the gingiva region on the teeth scan data.

In step 303, the digital model is provided to a 3D printer in order to three-dimensionally print or build a 3D-printed bleaching tray that includes the trench and the bleaching material reservoir(s) in accordance with the digital model.

In step 304, a thermoforming process may be applied to the 3D-printed bleaching tray in order to cure the device for suitable use by the patient associated with the teeth scan data.

Figure 4:
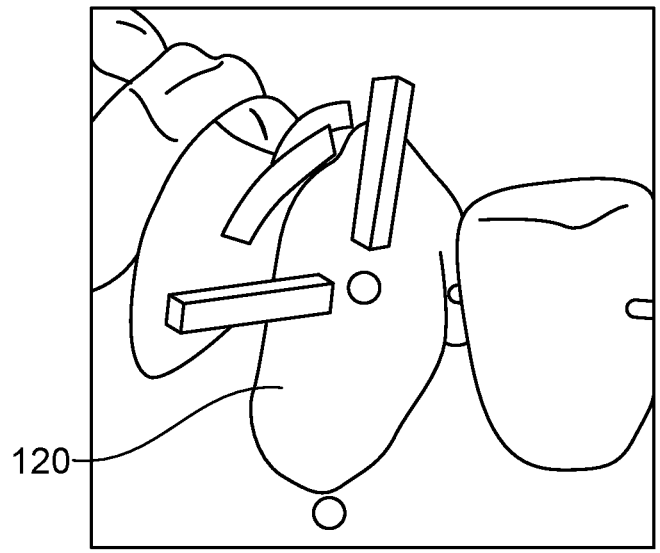
FIG. 4 shows a selection of each tooth for moving them to a desired position in one embodiment of the present invention.
Figure 5:
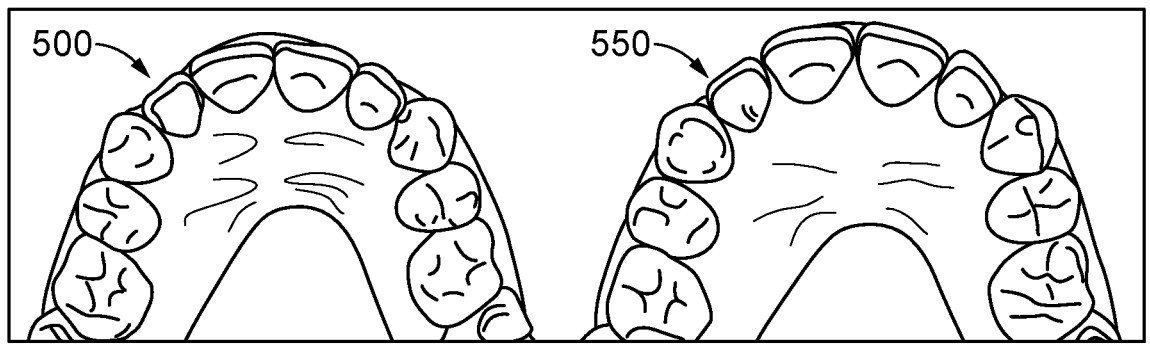
FIG. 5 shows a comparison of the teeth alignment model before and after teeth movement in one embodiment of the present invention.

Referring to FIG. 4, a selection of each tooth 120 for moving them to a desired position is illustrated in an exemplary screen output of a software module in accordance with the present invention. In one embodiment, the tooth 120 is moved with respect to the function of the appliance, as well as the 3D printer manufacturing tolerances. In one embodiment, the selected tooth 120 is moved buccally—this may be performed manually or automatically. Referring to FIG. 5, a comparison of the teeth alignment model before movement 500 and after movement 550, is illustrated.

Figure 6:
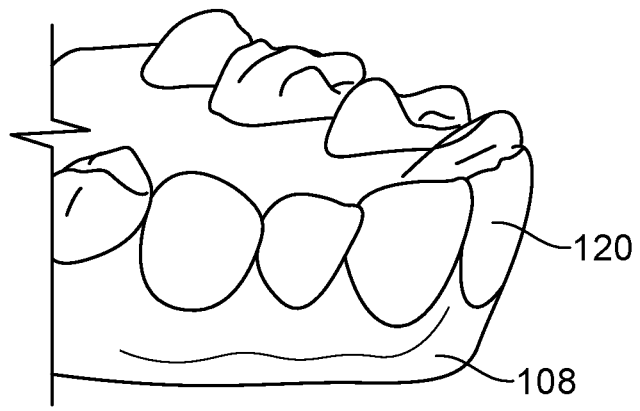
FIGS. 6-11 show a process of preparing an original model of the mouth and separating the teeth for performing bleaching in one embodiment of the present invention.

Referring to FIGS. 6-11, a process of preparing an original model of the mouth and separating the teeth 120 is illustrated. Upon successful teeth movement, the model is duplicated as shown in FIG. 6. In one embodiment, each tooth 120 is selected from the model to apply a mesial movement. In one embodiment, another model is selected to apply a distal movement. These 3 movements of the gingiva 108 may be combined at a later step. The models may be exported, including the original positioning, which is preserved in the digital model since the teeth of the patient are not really moving; instead the movement will create or form the desired trench. As such, the original position of the teeth is unchanged to remain constant. In exemplary embodiments, these files may be combined and or uploaded into a suitable software module to make adaptations.

Figure 7:
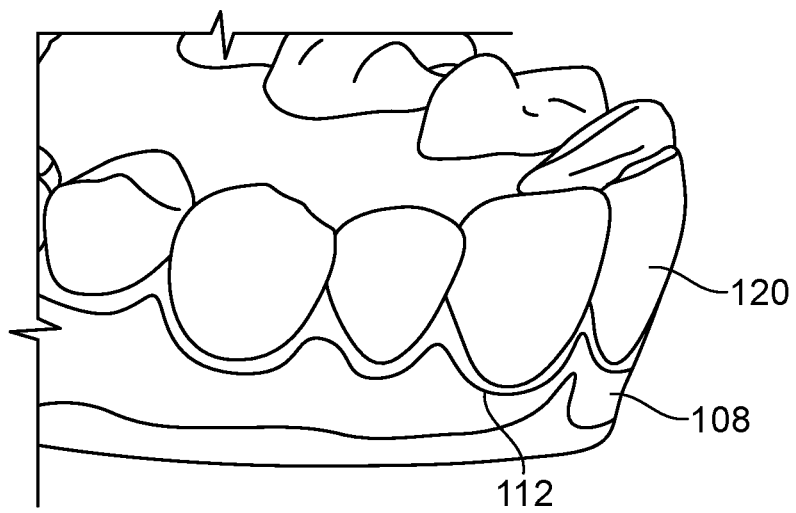

At one step, the final moved gingiva position is isolated as shown in FIG. 6, as this will be a base for the device 200. In another step, for example a subsequent step, the tooth segmentation in the software module retains its data in this situation. In one embodiment, a boundary 112 between the teeth 120 and gingiva 108 is recreated automatically and the files are separated accordingly as shown in FIG. 7.

Figure 8:
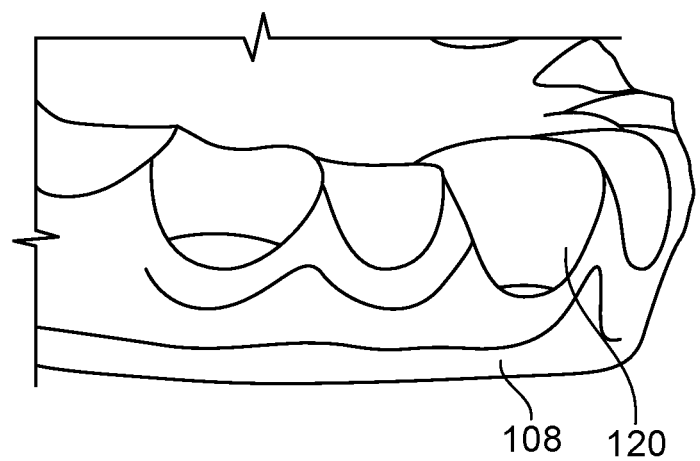
Figure 9:
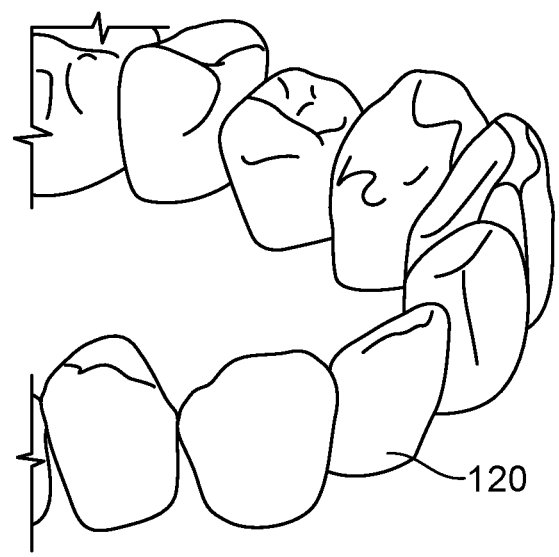
Figure 10:
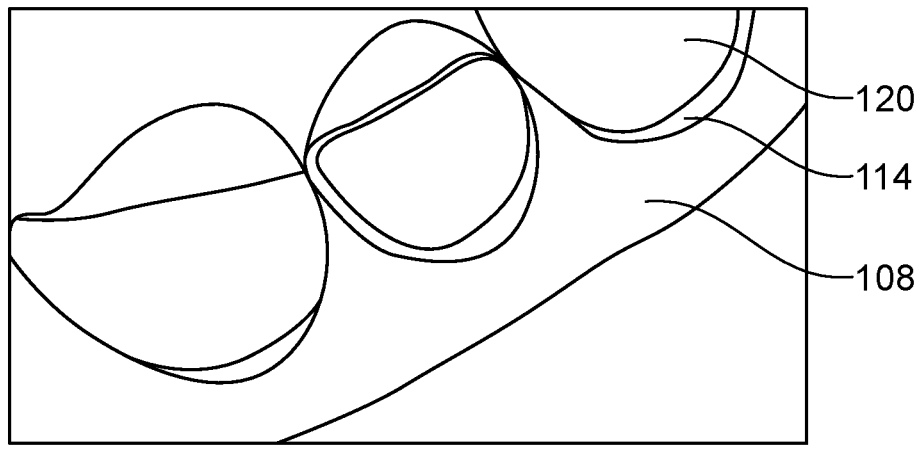

In yet another step, for example a subsequent step, the teeth 120 that have moved and cut from the gingiva 108, leave a base that has been adapted without teeth 120 as shown in FIG. 8. In one embodiment, the above said teeth movement and cutting them from gingiva is repeated for both the mesial and distal movement sets and then combined. In yet another step, for example a subsequent step, the original model is imported and the teeth 120 are separated from the original gingiva 108 as shown in FIG. 9. In yet another step, for example a subsequent step, the original position of the tooth 120 is combined with the cut, moved gingiva 108 as shown in FIG. 10.

In one embodiment, the resultant model is provided with an open or gap 114 which forms a trench such as trench 203 between the gingiva 108 and teeth 120. In exemplary embodiments, the trench may be equal to the distance moved in the software module.

Figure 11:
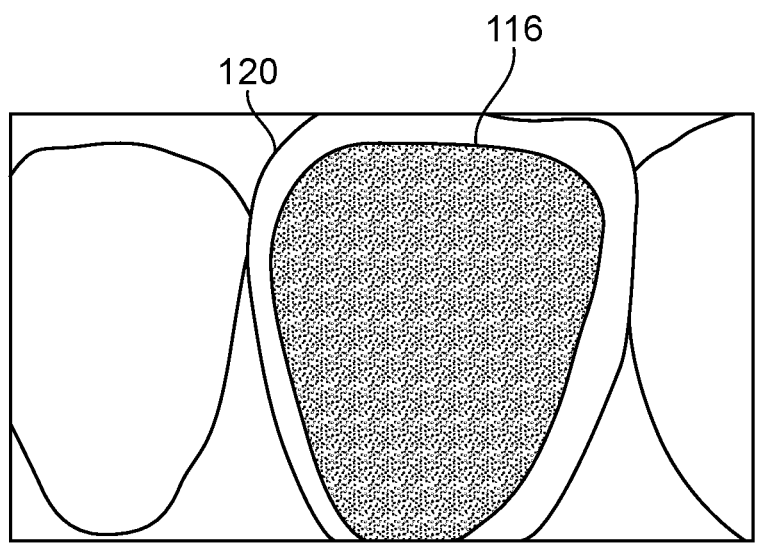

In exemplary embodiments, another step may include drawing or creating an outline 116 on the surface of the teeth 120. This outline may be used to form the bleaching material reservoir 204 as shown in FIG. 11. In one embodiment, the outline 116 is shelled with a thickness that is selected based on testing.

In exemplary embodiments, another step may include 3D printing the model and subsequently applying a thermoforming process. The end result is a custom bleaching tray or device 200 as shown in FIG. 12-FIG. 13.

Figure 12:
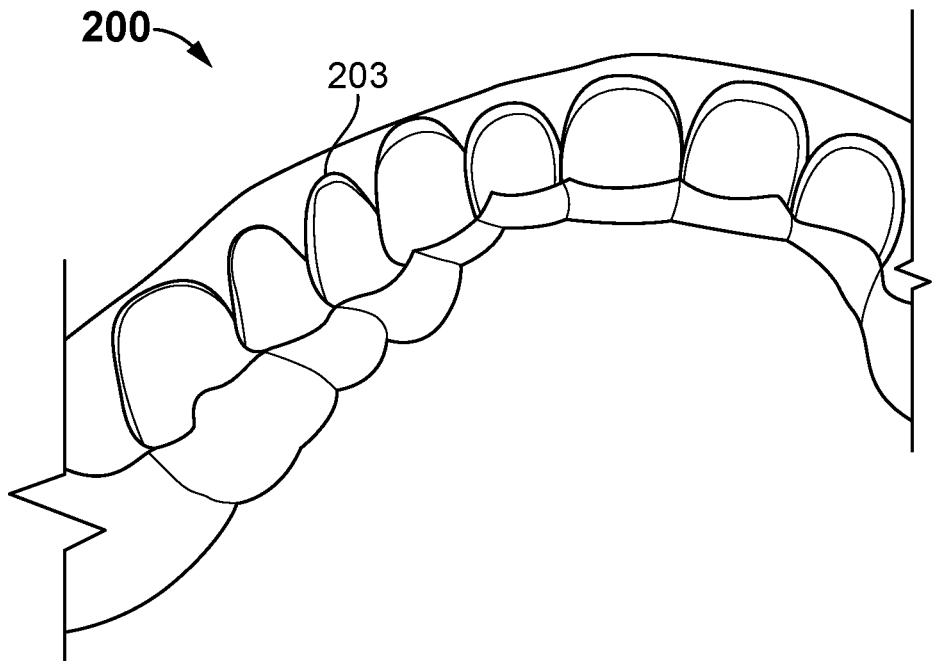
FIG. 12 shows a top perspective view of the device in one embodiment of the present invention.
Figure 13:
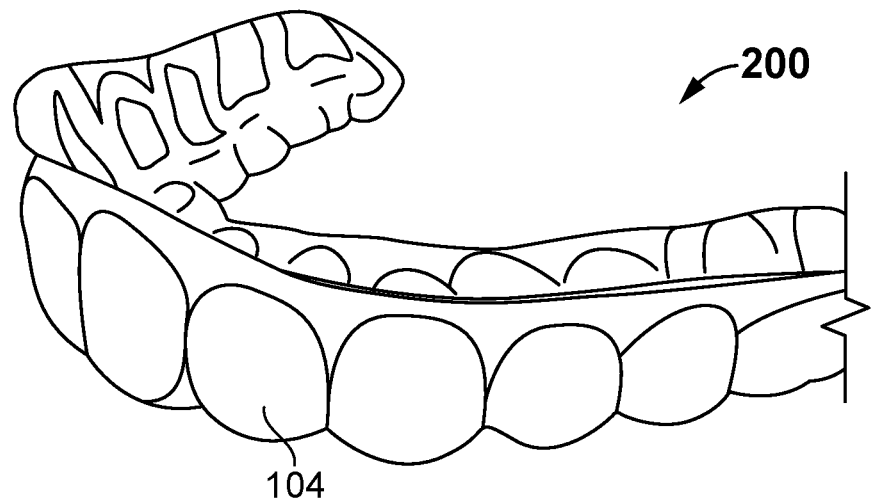
FIG. 13 shows a front perspective view of the device in one embodiment of the present invention.

Referring to FIGS. 12-13, a top perspective view and a front perspective view of the device 200 respectively, are illustrated. In one embodiment, the device 200 comprises a trench 203 and a reservoir 204. In one embodiment, the trench 203 is configured to avoid leakage of bleaching material onto the gingiva 108. In one embodiment, the reservoir 204 is configured to specifically hold the bleaching material on the surface of the tooth 120.

Figure 14:
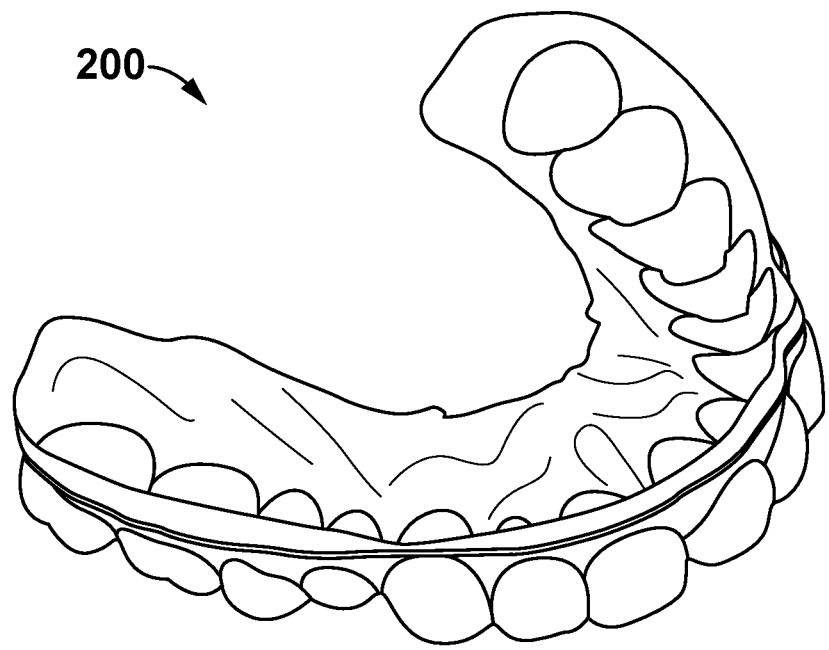
FIGS. 14-15 show a custom bleaching tray printed with a 3D-printer in accordance with the present invention.
Figure 15:
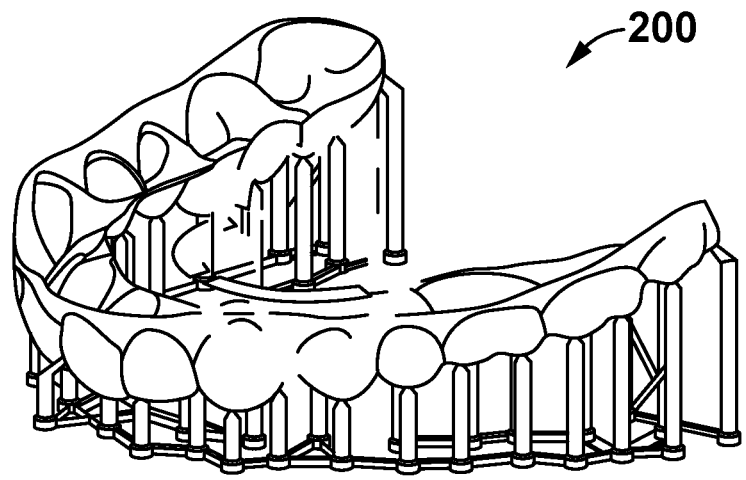
Figure 17:
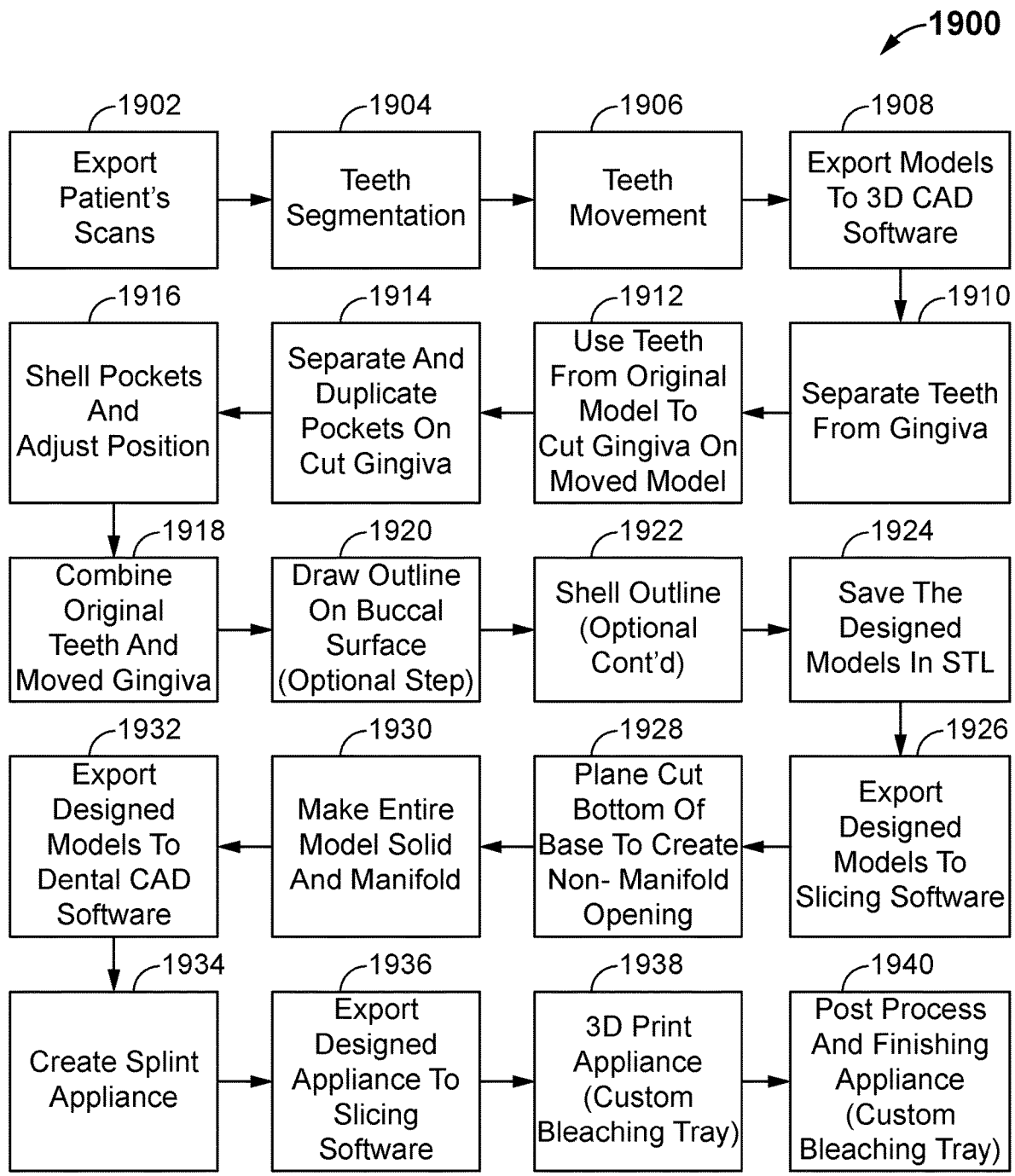
FIG. 17 shows a flowchart of a method for designing a direct 3D printing custom bleaching tray or device in one embodiment of the present invention.

Referring to FIG. 14-15, shows another view of custom bleaching tray 200. The device 200 may be printed using a full suite of advanced dental CAD functions. The direct print file is then utilized to form a 3D printed device 200 as shown in FIG. 17. In one embodiment, the direct print file is imported into a software application, for example, RayWare software, and 3D prints the appliance.

Figure 16:
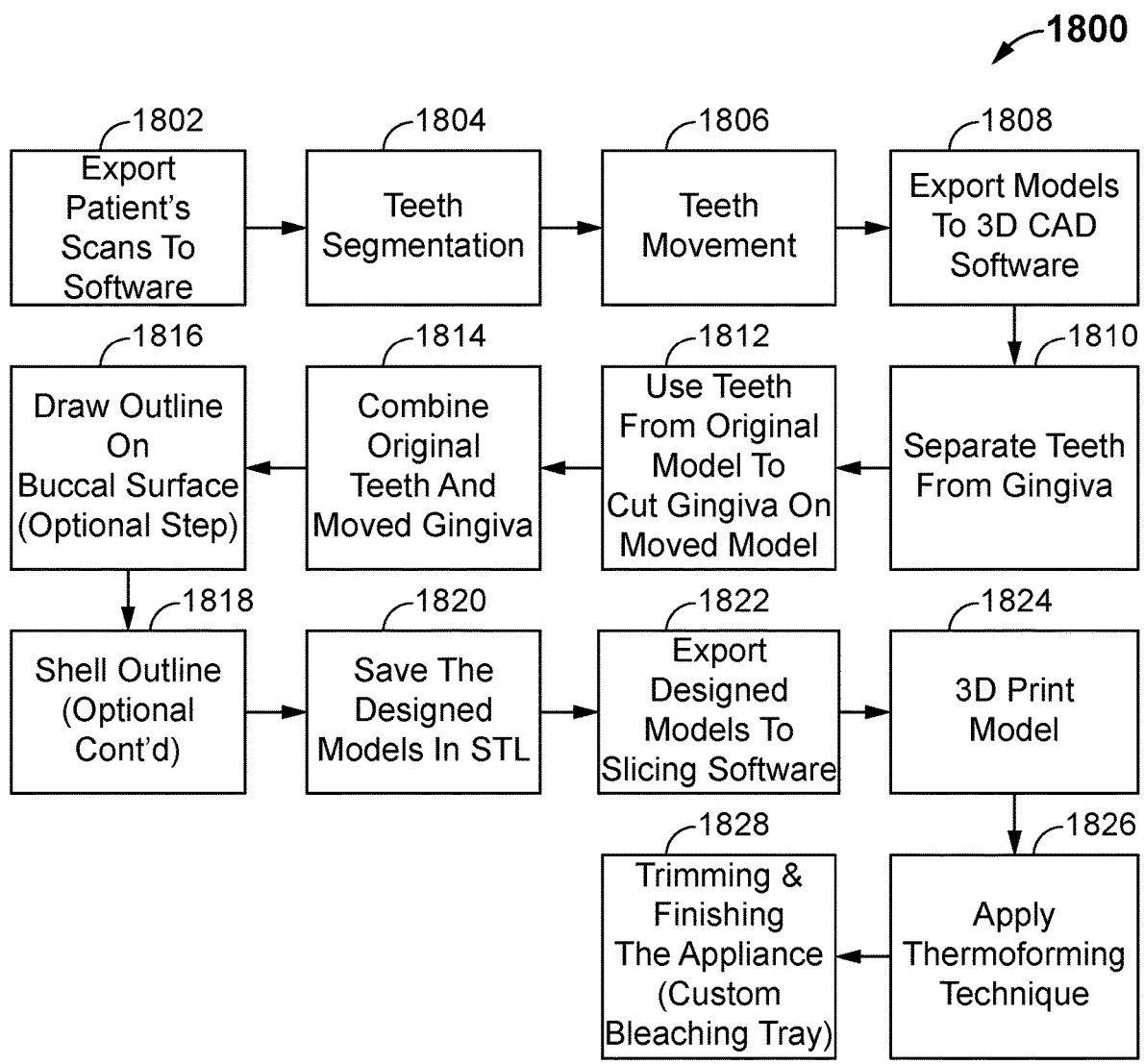
FIG. 16 shows a flowchart of a method for designing a model with the gingival trench for a custom bleaching tray or device in one embodiment of the present invention.

Referring to FIG. 16, a flowchart 1800 of a method for designing a model with a gingival trench for custom bleaching tray or device 200 is disclosed. The method comprises the following steps. At step 1802, the patient's scans are exported to software module. At step 1804, the software module performs teeth segmentation. At step 1806, teeth movement is performed based on teeth segmentation. At step 1808, a model with moved teeth is exported to 3D CAD software. At step 1810, the teeth are separated from the gingiva. At step 1812, the teeth from the original model are used to cut the gingiva on the moved model. At step 1814, the original teeth and the moved gingiva are combined. Optionally, at step 1816, an outline is drawn on the buccal surface. At step 1818, the outline is shelled. At step 1820, the designed models are saved in STL. At step 1822, the designed models are exported to slicing software. At step 1824, the model is printed in 3D print. At step 1826, the thermoforming technique is applied. At step 1828, the model is then trimmed and finished the get the final model.

Referring to FIG. 17, a flowchart 1900 of a method for designing a direct 3D printing custom bleaching tray or device 200 is disclosed. The method comprises the following steps. At step 1902, the patient's scans are exported to software module. At step 1904, the software module performs teeth segmentation. At step 1906, teeth movement is performed based on teeth segmentation. At step 1908, a model with moved teeth is exported to 3D CAD software. At step 1910, the teeth are separated from the gingiva. At step 1912, the teeth from the original model are used to cut the gingiva on the moved model. At step 1914, the reservoirs 204 are separated and duplicated on cut gingiva. At step 1916, the reservoirs 204 are shelled and their positions are adjusted. At step 1918, the original teeth and the moved gingiva are combined. Optionally, at step 1920, an outline is drawn on the buccal surface. At step 1922, the outline is shelled. At step 1924, the designed models are saved in STL. At step 1926, the designed models may be exported to slicing software. At step 1928, the bottom of the base may be cut to create a non-manifold opening. At step 1930, the entire model may be made to be solid and manifold. At step 1932, the designed models are exported to dental CAD software. At step 1934, a splint appliance is created. At step 1936, the designed appliance is exported to slicing software. At step 1938, the appliance is 3D printed. At step 1940, the appliance is post-processed and finished to get the final model.

Advantageously, the device of the present invention is used to bleach/whiten teeth without any spillage during use. The device eliminates the contact of whitening material with the gingiva, thereby avoiding any irritation or color change that occurred during the whitening process. The trench also prevents saliva from mixing with the bleaching material which improves the whitening process and keeps the patient more safe.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for forming a custom bleaching tray, comprising:
   receiving a digital model of a patient's mouth, the digital model including an initial tooth model and an initial gingiva model;
   moving at least one tooth in the initial tooth model and a corresponding gingiva portion in the initial gingiva model buccally, distally, and/or medially to form a moved tooth model and a moved gingiva model;
   separating the moved tooth model from the moved gingiva model to form a separated moved gingiva model;
   placing the initial tooth model onto the separated moved gingiva model to form a trench between the at least one tooth in the initial tooth model and the corresponding gingiva portion in the moved gingiva model to form an updated digital model;
   producing a physical bleaching tray corresponding to the updated digital model of the patient's mouth, the physical bleaching tray including a bleaching material reservoir at an inner surface that corresponds to a buccal surface of the at least one tooth in the initial tooth model and a bleaching material barrier, wherein the bleaching material barrier is formed based on the trench.

2. The method of claim 1 wherein the bleaching material reservoir is based on the moved tooth model.

3. The method of claim 1 wherein the at least one tooth in the initial tooth model is moved buccally to form a buccally moved tooth model, is moved distally to form a distally moved tooth model, and is moved medially to form a medially moved tooth model, and wherein the buccally moved tooth model, the distally moved tooth model, and the medially moved tooth model are combined to form the moved tooth model.

4. The method of claim 1 wherein the corresponding gingiva portion in the initial gingiva model is moved buccally to form a buccally moved gingiva model, is moved distally to form a distally moved gingiva model, and is moved medially to form a medially moved gingiva model, and wherein the buccally moved gingiva model, the distally moved gingiva model, and the medially moved gingiva model are combined to form the moved gingiva model.

5. The method of claim 1 wherein the producing a physical bleaching tray includes three-dimensionally (3D) printing and/or applying a thermoforming process.

6. A method for forming a custom bleaching tray, comprising:
   receiving a digital model of a patient's mouth, the digital model including an initial tooth model and an initial gingiva model;
   separating the initial gingiva model from the initial tooth model to form a separated gingiva model;
   moving a first gingiva portion in the separated gingiva model buccally, distally, and/or medially to form a moved gingiva model;
   placing the initial tooth model onto the moved gingiva model to form a trench between at least one tooth in the initial tooth model and the first gingiva portion in the moved gingiva model to form an updated digital model;
   producing a physical bleaching tray corresponding to the updated digital model of the patient's mouth, the physical bleaching tray including a bleaching material reservoir at an inner surface that corresponds to a buccal surface of the at least one tooth in the initial tooth model and a bleaching material barrier, wherein the bleaching material barrier is formed based on the trench.

7. The method of claim 6 wherein the first gingiva portion in the separated gingiva model is moved buccally to form a buccally moved gingiva model, is moved distally to form a distally moved gingiva model, and is moved medially to form a medially moved gingiva model, and wherein the buccally moved gingiva model, the distally moved gingiva model, and the medially moved gingiva model are combined to form the moved gingiva model.

8. The method of claim 6 further comprising:
   moving at least one tooth in the initial tooth model to form a moved tooth model.

9. The method of claim 8 wherein the bleaching material reservoir is based on the moved tooth model.

10. The method of claim 8 wherein the at least one tooth in the initial tooth model is moved buccally to form a buccally moved tooth model, is moved distally to form a distally moved tooth model, and is moved medially to form a medially moved tooth model, and wherein the buccally moved tooth model, the distally moved tooth model, and the medially moved tooth model are combined to form the moved tooth model.

11. The method of claim 6 wherein the producing a physical bleaching tray includes three-dimensionally (3D) printing and/or applying a thermoforming process.

* * * * *